(No Model.)
J. L. FINN.
BABY CARRIAGE.
No. 249,513. Patented Nov. 15, 1881.
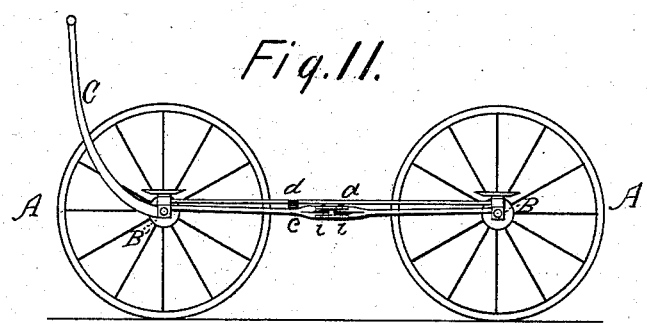
Fig. II.
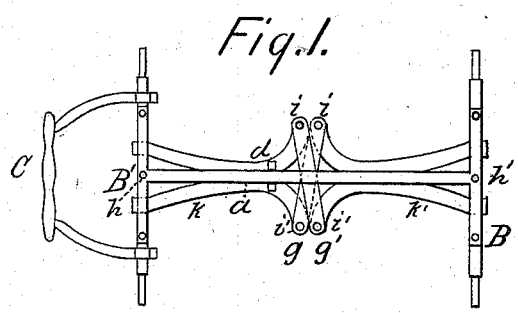
Fig. I.
Witnesses.
D. B. Andrews
H. F. Willson.
Inventor.
J. L. Finn.

UNITED STATES PATENT OFFICE.

JOHN L. FINN, OF ELYRIA, OHIO, ASSIGNOR TO DAVID B. ANDREWS AND THOMAS L. NELSON, BOTH OF SAME PLACE.

BABY-CARRIAGE.

SPECIFICATION forming part of Letters Patent No. 249,513, dated November 15, 1881.

Application filed April 6, 1881. (No model.)

*To all whom it may concern:*

Be it known that I, J. L. FINN, a citizen of the United States, residing at Elyria, in the county of Lorain and State of Ohio, have invented a new and useful Improvement in Baby-Carriages, of which the following is a specification.

My improvement relates to the method of guiding baby-carriages, as hereinafter described, by merely changing the relations of the axles from a parallel to an angular position. This object is attained by the mechanism illustrated in the accompanying drawings, in which—

Figure I is a plan view of the carriage with the wheels and body removed. Fig. II is a side elevation with the wheels on the front side removed.

Similar letters refer to similar parts throughout the several views.

The wheels A, axle-trees B B', and handles C constitute the running-gear of the carriage. Said axles are connected together by means of a connecting-bar, $a$, which is pivoted to the center of each axle in such a manner as will permit the axles to move freely either to the right or left in the act of changing the direction of travel. Directly under said bar $a$, and near its center, is positioned a lock. Said lock is supported in place by an arm, $c$, which is rigidly secured to axle B'. Said lock consists of a short lateral curved bar, which is in its upper surface recessed, as seen in the drawings, so as to clutch or take hold of bar $a$, for the purpose of locking or securing the rear axle, B', rigidly in a position at right angles to the said bar. This lock is operated by raising the handles of the carriage, which are also rigidly secured to the axle $a$, thus imparting to the axle a slight rotary motion, which communicates to arm $c$ a corresponding downward movement, which withdraws the locking-recess in bar $d$ down off from bar $a$, thus rendering the axle B' free to be cramped by any side strain or pressure on the handles to the right or left. When said axle is again brought to a right angle with bar $a$, and the handles are allowed to gravitate to the ordinary position, the lock instantly returns to its place, and thus again secures the axle rigidly in a position at right angles to the bar $a$.

Upon the ends of bar $a$ are secured lateral bars $f\ f\ f\ f$, which serve as supports for the springs which carry the body of the carriage.

In order to arbitrarily control the front axle, B, so that it will act simultaneously, but inversely, with axle B', for the purpose of facilitating the change of direction of the carriage while moving at the will of the operator, I connect the two axles together by the device illustrated in Fig. II, where $g\ g'$ represent two diagonal bars, which are pivoted to the several arms of two bifurcated levers, which are fixed at their opposite ends to the axles B B'. The point at which said diagonal bars are pivoted to said arms is determined by describing the arc of a circle having a radius equal to one-half the distance between the pivotal centers $h\ h'$, at which the bar $a$ is secured to the axles B B'; then, from a right line drawn between and from $h$ to $h'$, set off on said arcs equal distances, $i\ i\ i'\ i'$. At these points form the pivots for the diagonal bars at the extremities of the bifurcated levers, as seen in Fig. II. This device will work freely and permit the axles to be cramped within certain limits, dependent entirely upon the length of the diagonal bars.

For the practical working of carriages of this kind the diagonal bars may be very short, thus making a neat, attractive, and exceedingly effective device for the purpose, which is entirely under the control of the operator, and may be handled easily by a mere child.

What I claim as new, and desire to secure by Letters Patent, is—

1. The diagonal bars $g\ g'$, pivoted to the bifurcated arms $k\ k'$, in combination with the bar $a$ and lock $d$, the same being arranged in the manner and for the purpose substantially as described.

2. The diagonal bars $g\ g'$, pivoted to the bifurcated arms $k\ k'$, in combination with the axles B B', for the purpose of maintaining an inversely corresponding angle of divergence of said axles from a right line in the direction of travel.

3. The bar $a$, in combination with the lock $d$, the axle B', and handles C, for the purpose of holding the axle rigidly at right angles with said bar $a$, or allowing said axle to assume any other desired position at the will of the operator, as described.

J. L. FINN.

Witnesses:
H. F. WILLSON,
JAMES E. BRONSON.